United States Patent
Netzer et al.

(10) Patent No.: US 11,864,292 B2
(45) Date of Patent: Jan. 2, 2024

(54) ISOLATED CONVERTER WITH IMPROVED CURRENT SENSING

(71) Applicant: Tridonic GmbH & Co KG, Dornbirn (AT)

(72) Inventors: Harald Netzer, Nenzing (AT); Stefan Stark, Muntlix (AT)

(73) Assignee: Tridonic GmbH & Co KG, Dornbirn (AT)

( * ) Notice: Subject to any disclaimer, the term of this patent is extended or adjusted under 35 U.S.C. 154(b) by 0 days.

(21) Appl. No.: 17/996,513

(22) PCT Filed: Apr. 7, 2021

(86) PCT No.: PCT/EP2021/059059
§ 371 (c)(1),
(2) Date: Oct. 19, 2022

(87) PCT Pub. No.: WO2021/213803
PCT Pub. Date: Oct. 28, 2021

(65) Prior Publication Data
US 2023/0254958 A1 Aug. 10, 2023

(30) Foreign Application Priority Data
Apr. 23, 2020 (EP) .................................. 20170991

(51) Int. Cl.
*H05B 45/382* (2020.01)
*H05B 45/14* (2020.01)

(52) U.S. Cl.
CPC .......... *H05B 45/382* (2020.01); *H05B 45/14* (2020.01)

(58) Field of Classification Search
CPC ...... H05B 45/382; H05B 45/14; H05B 45/32; H05B 45/385; H05B 45/37; H05B 47/10
See application file for complete search history.

(56) References Cited

U.S. PATENT DOCUMENTS 9,807,830 B1 * 10/2017 Xiong ................ H05B 45/3725
9,923,455 B2 * 3/2018 Gong .................. H02M 1/4225
(Continued)

FOREIGN PATENT DOCUMENTS

CN 102348302 A * 2/2012
CN 105898946 A * 8/2016
(Continued)

OTHER PUBLICATIONS

PCT/EP2021/059059, International Search Report and Written Opinion dated May 14, 2021, 15 pages.
(Continued)

*Primary Examiner* — Harshad C Patel
*Assistant Examiner* — Syed M Kaiser
(74) *Attorney, Agent, or Firm* — Andrus Intellectual Property Law, LLP (57) ABSTRACT

The invention relates to an isolated converter (100) for providing a current supply to an LED load, comprising: a galvanic isolation stage (101); a sensing circuit (103) on a primary side of the isolation stage (101), which is magnetically coupled to a secondary side of the isolation stage (101); wherein the sensing circuit (103) is configured to receive a feedback signal that is proportional to a secondary side current; and a control unit (105) configured to determine an output current of the converter (100) based on the feedback signal; wherein at least one electrical characteristic of the sensing circuit (103) and/or the control unit (105) is adjustable to convert the feedback signal from a first ratio to a second ratio to the secondary side current.

16 Claims, 6 Drawing Sheets

(56) References Cited

U.S. PATENT DOCUMENTS

| | | | |
|---|---|---|---|
| 10,326,377 B1 | 6/2019 | Xiong et al. | |
| 10,542,600 B2 | 1/2020 | Lee et al. | |
| 2011/0215731 A1* | 9/2011 | Jeong | H05B 45/10 |
| | | | 315/254 |
| 2012/0062147 A1* | 3/2012 | Fan | H05B 45/382 |
| | | | 315/297 |
| 2012/0206064 A1* | 8/2012 | Archenhold | H05B 45/3725 |
| | | | 315/297 |

FOREIGN PATENT DOCUMENTS

| | | | | |
|---|---|---|---|---|
| DE | 102013226120 A1 * | 6/2014 | | H05B 33/0815 |
| DE | 10 2014 214746 A1 | 1/2016 | | |
| DE | 102013226120 B4 * | 1/2019 | | H05B 33/0815 |
| WO | 2015121011 A1 | 8/2015 | | |
| WO | WO-2015121011 A1 * | 8/2015 | | H05B 33/0815 |

OTHER PUBLICATIONS

Anonymous: "Multi Ratio Current Transformer Wiring Diagram Sample, Wiring Collection", May 31, 2018, https://headcontrolsystem.com/multi-ratio-current-transformer-wiring-diagram, accessed Oct. 4, 2022.
EP 20 170,991.2, Examination Report dated Apr. 24, 2023, 3 pages.

* cited by examiner

ISOLATED CONVERTER WITH IMPROVED CURRENT SENSING

CROSS REFERENCE TO RELATED APPLICATIONS

The present application is the U.S. national stage application of international application PCT/EP2021/059059 filed Apr. 7, 2021, which international application was published on Oct. 28, 2021 as International Publication WO 2021/213803A1. The international application claims priority to European Patent Application No. 20170991.2 filed Apr. 23, 2020.

TECHNICAL FIELD OF THE INVENTION

The invention relates to an isolated converter for providing a current supply to an LED load, and a method for operating such a converter. The invention further relates to a driver.

BACKGROUND OF THE INVENTION

Isolated converters, such as LLC converters, are generally known. Such converters typically comprise a transformer which is arranged between a primary and a secondary side of a galvanic isolation stage.

An isolated converter can be implemented in an LED driver to provide a stable DC power supply to an LED load. For instance, the converter provides an output current to the LED load in a certain current range.

It is generally known to implement a current sensing functionality in such a converter. For example, the output current can be sensed by means of an auxiliary winding on the primary side of the isolation stage or by means of a current sense transformer.

Some converters provide the output current over a wide current range, especially if they have a dimming function. However, the design of the auxiliary winding or the current sense transformer may only be optimized for either high, or low output currents within the provided current range. In particular, optimizing the design of these components for high output currents can lead to a decrease in signal quality of a sense signal at lower output currents, whereas optimizing the design for low output currents can lead to power losses at higher output currents.

Thus, it is an objective to provide an improved isolated converter, an improved method for operating an isolated converter, and an improved driver for supplying an LED load which avoid the above-mentioned disadvantages. In particular, it is an object to provide an isolated converter, which efficiently and accurately senses a secondary side current over a wide current range.

SUMMARY OF THE INVENTION

The object of the present invention is achieved by the solution provided in the enclosed independent claims. Advantageous implementations of the present invention are further defined in the dependent claims.

According to a first aspect, the present disclosure relates to an isolated converter for providing a current supply to an LED load, comprising: a galvanic isolation stage; a sensing circuit on a primary side of the isolation stage, which is magnetically coupled to a secondary side of the isolation stage; wherein the sensing circuit is configured to receive a feedback signal that is proportional to a secondary side current; and a control unit configured to determine an output current of the converter based on the feedback signal; wherein at least one electrical characteristic of the sensing circuit and/or the control unit is adjustable to convert the feedback signal from a first ratio to a second ratio to the secondary side current.

This achieves the advantage that the feedback signal can be adapted efficiently to achieve a more accurate determination of the secondary side current over a wide current range. In particular, the feedback signal can be adapted depending on a level of the secondary side current.

In particular, the sensing circuit and the control unit define a measurement path for the feedback signal. Depending on the electrical characteristic of these components, the measurement path is optimized for either high or low output currents. However, optimizing the measurement path for high output currents can lead to low measurement resolutions at low output currents, and optimizing the measurement path for low output currents can lead to a decrease of the light flicker performance and other unwanted issues at high output currents. Therefore, adjusting the at least one electrical characteristic of the sensing circuit and/or the control unit, allows for a dynamic optimization of the electrical properties of the measurement path to different output currents of the converter.

The isolated converter can be an LLC converter, in particular a LLC resonant half bridge converter, or a flyback converter.

The secondary side current can correspond to an output current of the converter, in particular a LED supply current, or can be representative of the output current.

The feedback signal can represent the secondary side current of the converter. In particular the feedback signal is a current and/or a voltage signal.

The isolated converter can be a primary side switched converter. The converter can comprise a switching network on the primary side of the galvanic isolation stage. Preferably, the primary side comprises two or four switches, wherein the control unit is configured to control the switching operation of the switches, in particular based on the determined output current.

The isolated converter can be a DC/DC stage for supplying the LED load with a regulated output current and voltage.

The LED load can comprise an LED module, an LED luminaire and/or an LED track. In particular, the LED load is dimmable.

In an embodiment, the sensing circuit comprises an auxiliary winding that is magnetically coupled to at least one secondary side winding, wherein the auxiliary winding comprises an adjustable number of turns that can be changed in one or more steps.

This achieves the advantage that the feedback signal can be converted efficiently. In particular, the feedback signal is indirectly proportional to the ratio of the turns of the auxiliary winding to the turns of the at least one secondary side winding.

In particular, the ratio of the feedback signal to the secondary side current is at least partially defined by the turn ratio of the auxiliary winding to the at least one secondary side winding. By changing the number of windings of the auxiliary winding, this ratio and, thus, the feedback signal can be adapted.

Preferably, the number of turns of the auxiliary winding can be changed in a stepwise manner by connecting or disconnecting a number of windings in series, wherein the auxiliary winding is formed by all windings of the sensing circuit that are connected in series and coupled to the secondary side windings.

In an embodiment, the sensing circuit comprises at least one shunt resistor, wherein a total resistance of the at least one shunt resistor can be adjusted in a stepwise or a continuous manner, in particular by connecting or disconnecting two or more shunt resistors in parallel.

This achieves the advantage that the feedback signal can be adapted efficiently by means of the total shunt resistance. In particular, there is a linear dependency between the total shunt resistance and the feedback signal.

For example, a high shunt resistance is preferable when sensing low secondary side currents, because it allows to limit a gain of the control unit and, thus, improve signal quality. In contrast, a low shunt resistance is preferable when sensing high secondary side voltages, because it allows to reduce power losses.

Preferably, the sensing circuit comprises two or more shunt resistors that are connected in parallel, wherein each of the two or more shunt resistors can be connected or disconnected from the other shunt resistor(s) by a switch. In this way, the total shunt resistance can be changed in a stepwise manner.

In an embodiment, the control unit is configured to internally modify the feedback signal.

In an embodiment, the control unit is configured to convert the feedback signal from the first to the second ratio by adjusting an amplifier gain of an internal amplifier and/or by adjusting a reference voltage of an internal analog-to-digital converter (ADC).

This achieves the advantage that the feedback signal can be adapted efficiently by means of the control unit. In particular, there is a linear dependency between the feedback signal, especially a voltage component of the feedback signal, and the amplifier gain or the reference voltage.

Preferably, the at least one electrical characteristic of the sensing circuit or the control unit comprises the number of turns of the auxiliary winding, the total resistance of the at least one shunt, the amplifier gain, and/or the reference voltage of the ADC.

In an embodiment, the control unit comprises an ASIC and/or a microcontroller.

In an embodiment, the sensing circuit is connected to the control unit via one or two sensing pins for forwarding the feedback signal.

This achieves the advantage that the feedback signal can be forwarded efficiently to the control unit.

In particular, using two sensing pins allows to perform a differential measurement.

In an embodiment, the converter is designed to provide the output current in at least one dimming range.

In an embodiment, the feedback signal is set to a fixed ratio to the secondary side current for all dimming ranges of the converter, wherein the fixed ratio depends on a maximum current level to be detected.

This achieves the advantage that the feedback signal can be optimized for detecting high secondary side currents.

In an embodiment, the feedback signal is settable to different ratios to the secondary side current in two or more portions of the dimming range.

This achieves the advantage that the feedback signal can be adapted to different output currents within the current range, e.g. the feedback signal can be converted to higher values for low output currents and to lower values for high output currents within the current range.

According to a second aspect, the present disclosure relates to a driver for supplying an LED load, comprising an isolated converter according to the first aspect of the present disclosure.

The converter can be a DC/DC stage of the driver. In particular, the converter is an isolated primary side switched converter.

The above description with regard to the isolated converter according to the first aspect of the present disclosure is correspondingly valid for the driver according to the second aspect of the present disclosure.

According to a third aspect, the present disclosure relates to a method for operating an isolated converter for providing a current supply to an LED load, wherein the isolated converter comprises a galvanic isolation stage, the method comprising the steps of:

receiving a feedback signal by means of a sensing circuit on a primary side of the galvanic isolation stage, wherein the feedback signal is proportional to a secondary side current; and determining by means of a control unit an output current of the converter based on the feedback signal;

wherein at least one electrical characteristic of the sensing circuit and/or the control unit is adjustable to convert the feedback signal from a first ratio to a second ratio to the secondary side current.

This achieves the advantage that the feedback signal can be adapted efficiently to achieve a more accurate determination of the secondary side current over a wide current range.

In an embodiment, the sensing circuit comprises an auxiliary winding that is magnetically coupled to at least one secondary side winding, wherein the auxiliary winding comprises an adjustable number of turns that can be changed in one or more steps.

This achieves the advantage that the feedback signal can be converted efficiently. In particular, the feedback signal is indirectly proportional to the ratio of the turns of the auxiliary winding to the turns of the secondary side winding.

In an embodiment, the sensing circuit comprises at least one shunt resistor, wherein a total resistance of the at least one shunt resistor can be adjusted in a stepwise or a continuous manner, in particular by connecting or disconnecting two or more shunt resistors in parallel.

This achieves the advantage that the feedback signal can be adapted efficiently by means of the shunt resistance. In particular, there is a linear depend between the shunt resistance and the feedback signal.

In an embodiment, the control unit is configured to convert the feedback signal from the first to the second ratio by adjusting an amplifier gain of an internal amplifier and/or by adjusting a reference voltage of an internal analog-to-digital converter.

This achieves the advantage that the feedback signal can be adapted efficiently by means of the control unit. In particular, there is a linear dependency between the feedback signal, especially a voltage component of the feedback signal, and the amplifier gain or the reference voltage.

The above description with regard to the isolated converter according to the first aspect of the present disclosure is correspondingly valid for the method according to the third aspect of the present disclosure.

BRIEF DESCRIPTION OF THE DRAWINGS

The invention will be explained in the followings together with the figures.

DETAILED DESCRIPTION OF THE PREFERRED EMBODIMENTS

Figure 1:
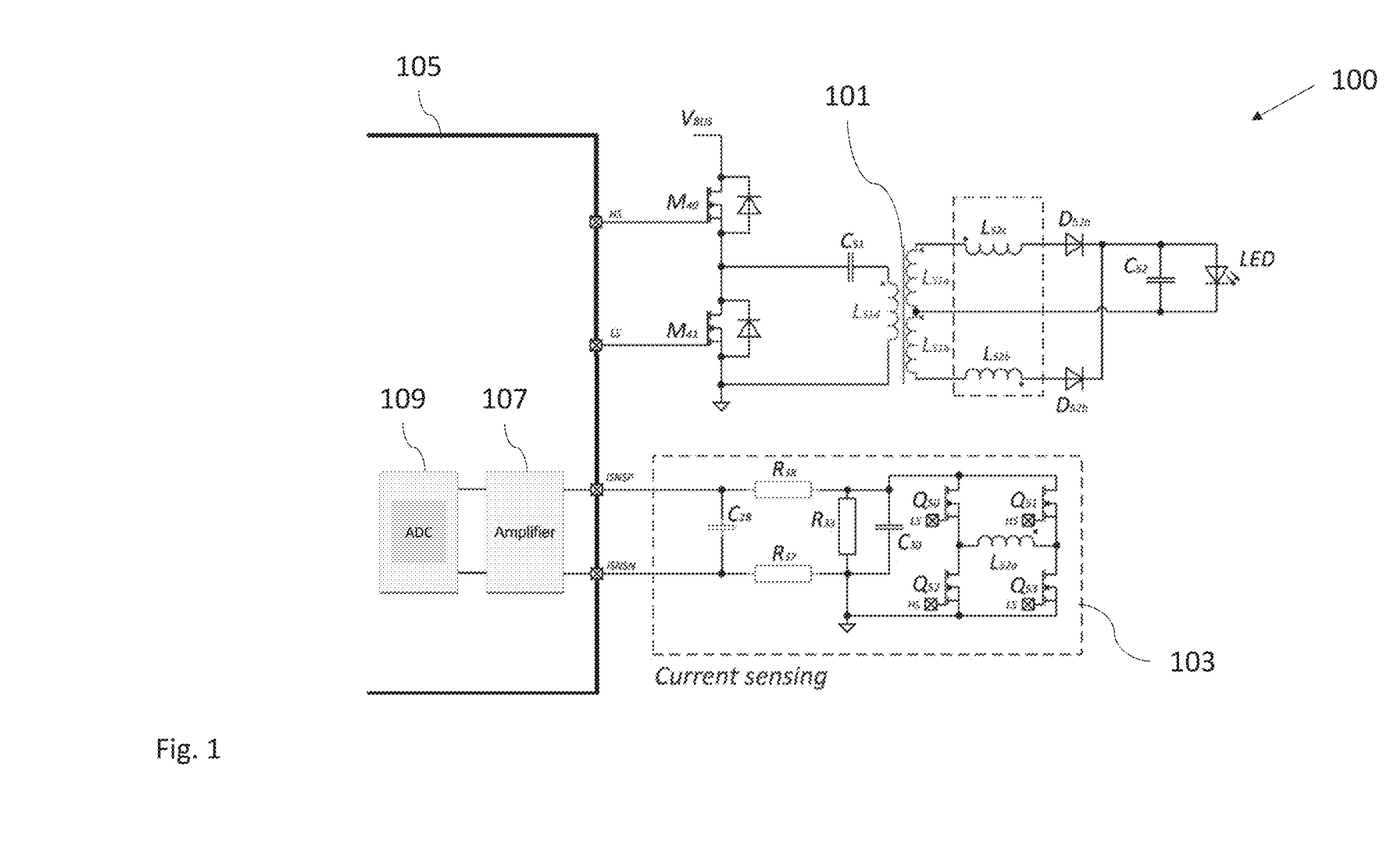
FIG. 1 shows a schematic diagram of an isolated converter according to an embodiment.

FIG. 1 shows a schematic diagram of an isolated converter 100 according to an embodiment. The isolated converter 100 can provide a current supply to an LED load.

The isolated converter 100 comprises a galvanic isolation stage 101, a sensing circuit 103 on a primary side of the isolation stage 101, which is magnetically coupled to a secondary side of the isolation stage 101, wherein the sensing circuit 103 is configured to receive a feedback signal that is proportional to a secondary side current, and a control unit 105 configured to determine an output current of the isolated converter 100 based on the feedback signal. Thereby, at least one electrical characteristic of the sensing circuit 103 and/or the control unit 105 is adjustable to convert the feedback signal from a first ratio to a second ratio to the secondary side current.

The exemplary isolated converter 100, shown in FIG. 1, is an LLC converter. Alternatively, the isolated converter 100 can be a different type of isolated converter, e.g. a flyback converter.

The secondary side current can correspond to an output current of the converter 100, in particular a LED supply current, or can be representative of the output current.

For instance, the converter 100 is configured to provide the output current in a range from 900 to 1800 mA, or in a range from 1000 to 2300 mA. If the converter is adapted for dimming the output current to a minimum of 1%, these ranges are increased to 9 mA-1800 mA, or to 10 mA-2300 mA, respectively.

The larger the output current range of the converter 100, the more difficult it is to sense the output current accurately over the entire range. Adjusting the electrical characteristics of the sensing circuit 103 or the control unit 105, allows optimizing the ratio between feedback signal and output current for different output currents of the range. Thus, the current sensing of the converter 100 is improved.

The feedback signal can represent the secondary side current of the converter 100. In particular, the feedback signal comprises current and/or voltage components.

The converter 100, as shown in FIG. 1, comprises, a power circuit of the converter in the upper half and the sensing circuit 103 in the lower half. The power circuit comprises two half bridge FETs M40, M41, a resonance capacitor C51, and an LLC transformer, which comprises windings L51a, L51b and L51d. The converter 100 further comprises secondary side rectifier diodes D52a, D52b, an output filter capacitor C52, and the LED load (referenced by the LED symbol and the word LED). The LED load may comprise an LED module, an LED luminaire and/or an LED track. The power circuit may further comprise an input for a bus voltage VBUS. For instance, the converter is configured to convert the bus voltage to an LED supply voltage.

The control unit 105 can be an ASIC and/or a microcontroller.

The control unit in FIG. 1 further comprises an amplifier 107 and an analog-to-digital converter (ADC) 109, which can be a 12-bit or a 10-bit ADC within the ASIC.

The sensing circuit 103 can comprise the auxiliary winding L52a, active bridge rectifiers Q50-Q53, a filter capacitor C30, a shunt resistor R33, a lowpass filter consisting of resistors R38, R37 and capacitor C28. In particular, the auxiliary winding L52a and the two secondary side windings L52b, L52 form a current sensing transformer.

The current sensing transformer formed by windings L52a-c can a have a certain turn ratio. For instance, the turn ratio can be 1/20. This means L52b and L52c have, for example, turns each and L52a has, for example, 100 turns. In this example, the current through auxiliary winding L52a is 1/20 of the output current (that splits through L52b and L52c).

The current through the auxiliary winding L52a, i.e. the feedback signal received at L52, can be rectified by the bridge rectifiers Q50 to Q53. The rectified current can then be filtered using C30. The filtered current can, in turn, flow through the shunt resistor R33. The voltage drop across R33 can be averaged using a low pass filter formed by R38, R37 and C28. The averaged voltage is fed to sensing pins ISNSP and ISNS of the control unit 105, which can form an input of an ASIC. The voltage between the sensing pins ISNSP and ISNSN can be amplified by amplifier 107 and then sampled with the, e.g. 12-bit, ADC 109.

For example, with a current sensing transformer turn ratio of 1/20 and an output current of 2.3 A the averaged rectified current through auxiliary winding L52a is 2.3A/20=0.115A. Using a shunt resistor R33 of 3R this leads to an averaged voltage between the sensing pins ISNSP and ISNSN of 3R*0.115A=0.345V.

The maximum input voltage of the control unit 105 can be limited to, for instance, 0.3V. Thus, the maximum measurable current is 0.3V/3R*20=2A. The signal between ISNSP and ISNSN can be amplified with a gain of, e.g., 6.66. This means the voltage after the amplifier 107 has a range between 0V and 2V (=0.3V*6.66), which is the input voltage range of the 12-bit ADC 107.

However, an amplifier 107 with such a high gain might introduce noise into the system which can have a negative influence on light flicker results at low output currents. Therefore, it would be desired to have lower gain values but a higher shunt resistance, to improve the signal to noise ratio. For example, the shunt R33 could be increased by a factor of 6.66 from 3R to 20R, while the amplifier gain is reduced from 6.66 to 1. In this case the voltage at the ADC 109 input would remain unaffected but the signal quality would be improved. Increasing the shunt resistor can have the drawback of higher power losses at high output currents, e.g. at 2A and 20R shunt resistor the losses would be $(2A/20)^2 \cdot 20R = 0.2$ W. Therefore, it is desirable to have a higher shunt resistance at low output currents and a low shunt resistance at high output currents.

The input voltage $V_{ADC\_in}$, i.e. the feedback signal, provided to the ADC 109 can be expressed by the following equation, wherein the current sensing transformer turn ratio is 1/20, and wherein $R_s$ is the shunt resistor R33, $g_{amp}$ is the gain of the amplifier 107 before the ADC 109, and $I_{LED}$ is the output current:

$$V_{ADC\_in} = \frac{I_{LED}}{20} \cdot R_s \cdot g_{amp} = I_{LED} \cdot g_x$$

The shunt resistance, the current sensing transformer turn ratio and the amplifier gain can be summarized by the linear factor $g_x$, wherein $g_x$ represents a ratio of the feedback signal (here: $V_{ADC\_in}$) to the output current $I_{LED}$.

In other words, the ratio between the feedback signal, in particular $V_{ADC\_in}$, and the secondary side current, in particular output current LED, depends on several electrical characteristics of the sensing circuit 103 (sensing transformer turn ratio, shunt resistance) and the control unit 105 (amplifier gain). Making at least one of these characteristics adaptable, allows changing this ratio and adapting the feedback signal, e.g. to allow a better sensing of high or low output currents.

Preferably, in order to increase the measurable current range and to improve a flicker performance of the converter 100, it can be desirable to make the above relationship between feedback signal and output current non-linear, in particular by adapting at least one of the electrical characteristics that determine the factor $g_x$ at certain output currents. For example, regarding the flicker performance it is advantageous to have a high ADC 109 input voltage, i.e. a high feedback signal and a high $g_x$, at low output currents. In contrast, for larger output currents (and a larger output current window) it can be desirable to decrease the factor $g_x$.

The factor $g_x$, and, thus, the feedback signal is preferably increased, by increasing the shunt resistance or by lowering the turn ratio of the current sense transistor. Preferably, the factor can also be increased by increasing the amplifier gain $g_{amp}$, however, this might introduce unwanted noise. In contrast, for larger output currents (and a larger output current window) it can be desirable to decrease the factor $g_x$.

In an embodiment, the control unit 105 is configured to internally modify the feedback signal. For example, the amplifier 107 can be configured to adapt the amplifier gain (as explained above). In particular, the amplifier 107 can be configured to switch between different amplifier gains depending on the output current. For example, if a higher shunt resistance is used, e.g. 6R instead of 3R, to achieve a higher signal to noise ratio, then a gain of 6.66 can be set at low LED currents, and a gain of 3.33 or 1 can be set at higher LED currents.

Alternatively, also the ADC 109 of the control unit 105 can be configured to change the feedback signal, e.g. by adjusting a reference voltage.

In case of a converter 100 with dimming functionality, the feedback signal can be set to a fixed ratio to the secondary side current for all dimming ranges of the converter 100, wherein the fixed ratio depends on a maximum current level to be detected.

Alternatively, the feedback signal can be settable to different ratios to the secondary side current in two or more portions of the dimming range of the convert 100. For instance, the feedback signal is increased for low currents within the dimming range and decreased for high currents within the dimming range. In particular, the resolution at the ADC 109 can be finer, the smaller the output current to be detected, which leads to a non-linear, e.g. stepwise changing, resolution curve of the ADC 109 across the dimming range.

Figure 2:
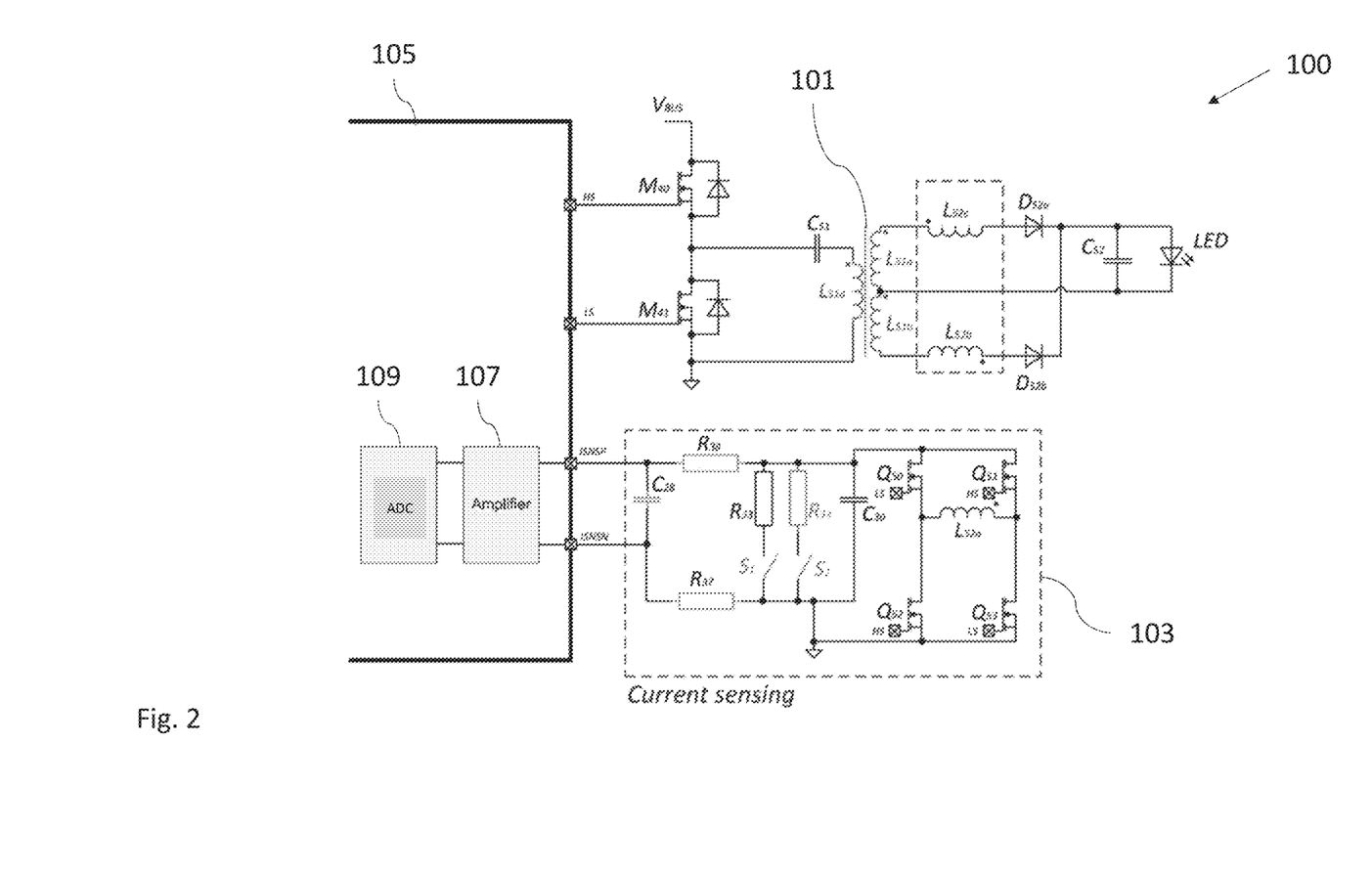
FIG. 2 shows a schematic diagram of an isolated converter according to an embodiment.

FIG. 2 shows a schematic diagram of the isolated converter 100 according to an embodiment.

The sensing circuit 103 of the converter 100 shown in FIG. 2 comprises two shunt resistors R33, R34, which can be selected (or combined in parallel) using switches S1 and S2. With this approach the total shunt resistance, i.e. the combined resistance of R33 and R34 in parallel, can be selected dynamically depending on the desired output current. For example, if the total shunt resistance is decreased by a factor of 2, then the output current range (or at least the measurable feedback signal) is doubled.

In particular, sensing circuit 103 can comprise any number of shunt resistors that are connected in parallel, wherein each shunt resistor can be connected or disconnected by means of a switch.

Figure 3:
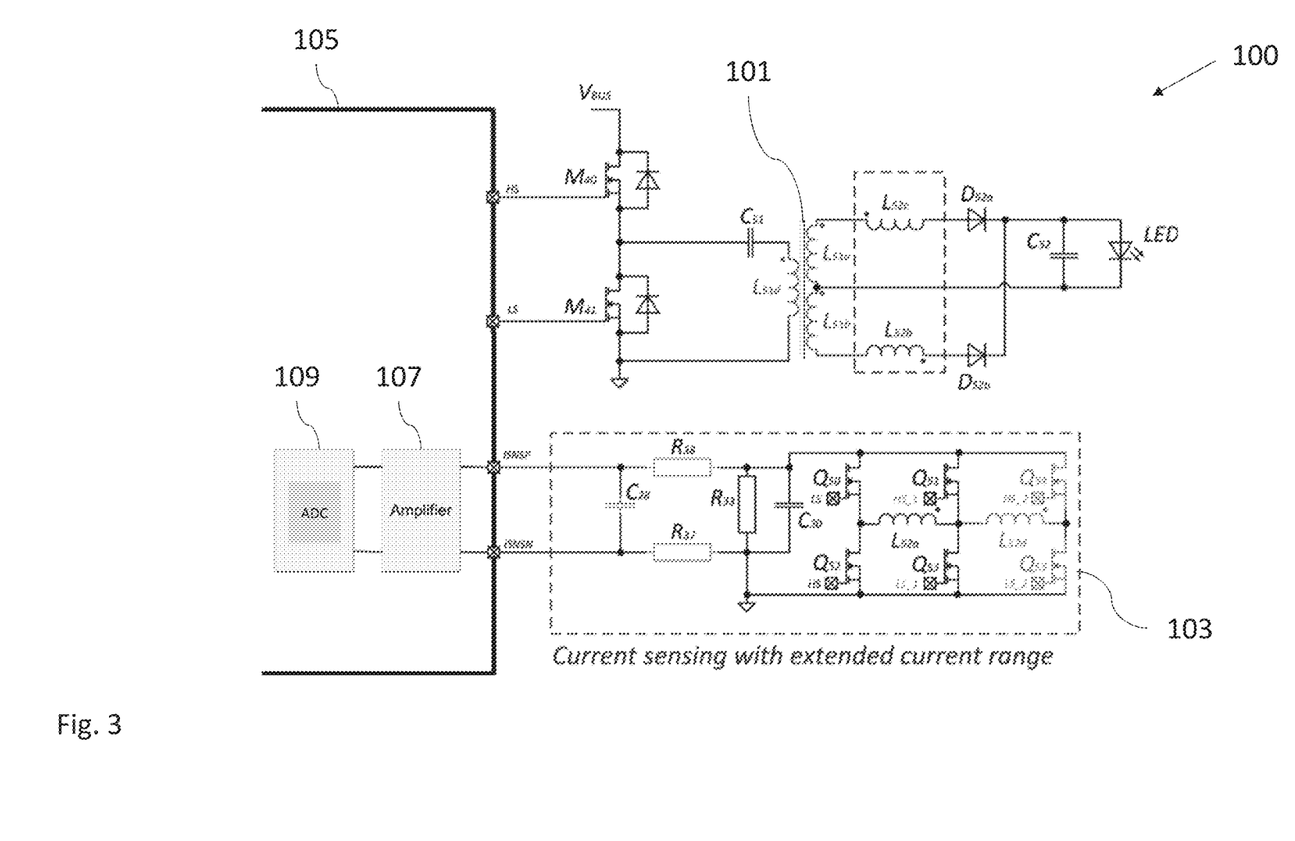
FIG. 3 shows a schematic diagram of an isolated converter according to an embodiment.

FIG. 3 shows a schematic diagram of the isolated converter 100 according to an embodiment.

The sensing circuit 103 of the converter 100 shown in FIG. 3 comprises an auxiliary winding L52a, L52d with an adjustable number of turns that can be changed in one or more steps. In particular, the auxiliary winding can comprise two or more winding portions, here L52a and L52d, which form a single winding with a tap. The sensing circuit 103 can comprise further active rectification switches Q54, Q55 for the additional winding portion L52d.

Preferably, the auxiliary winding formed by L52a and L52d and the secondary side windings L52b, L52c form a current sensing transformer, which's turn ratio can be adjusted by adjusting the number of turns of the auxiliary wining, e.g. from 1/20 to 1/10.

In particular, if a turn ratio of 1/20 is desired, in particular at high output currents, the rectification is done by utilizing switches Q50, Q52, Q54 and Q55. The other switches Q51 and Q53 remain turned OFF. In this case the auxiliary winding is formed by the winding sections L52a and L52d which are in series. For example, L52a and L52d both have 50 turns; with 5 turns on the power side, this results in a turn ratio of 5/(50+50)=1/20.

In contrast, if a turn ratio of 1/10 is desired, in particular at low output currents, the rectification is done by utilizing switches Q50, Q52, Q51 and Q53. The other switches Q54 and Q55 remain turned OFF, so that the auxiliary winding is only formed by the winding section L52a and a turn ratio of 5/50=1/10 is achieved.

With the approach shown in FIG. 3, the feedback signal can be converted by the sensing circuit 103 without changing the total shunt resistance, as disclosed above with regards to FIG. 2. This can be advantageous under certain conditions, for example the switches S1, S2 of the shunt resistors R33, R34 in FIG. 2 can have non-zero conduction losses, which can be temperature dependent and add to the shunt resistance.

Preferably, the converter 100 can comprise an adaptable shunt resistance, as for example shown in FIG. 2, and an auxiliary winding with an adaptable number of turns, as for example shown in FIG. 3. In addition, the converter 100 can comprise an amplifier 107 with adjustable gain and/or an ADC 109 with adjustable reference voltage.

Figure 4:
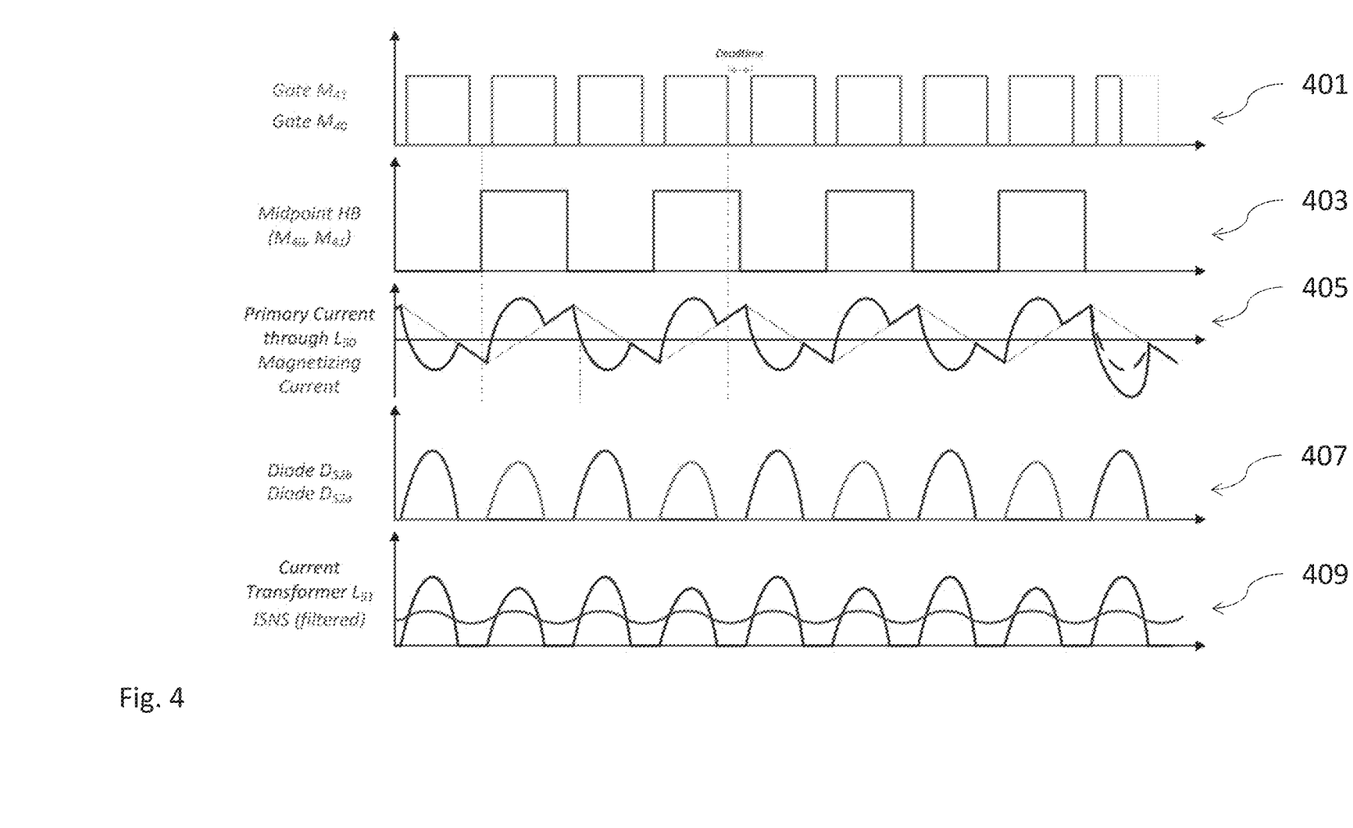
FIG. 4 shows plots of various operating parameters of an isolated converter according to an embodiment.

FIG. 4 shows plots of various operating parameters of an isolated converter according to an embodiment. In particular, FIG. 4 shows different signals at various points of the converter 100 shown in FIG. 1, 2 or 3 during operation.

In the first plot 401, the gate signals of the half bridge switches M41, M40 are shown, whereas in FIGS. 1-3 "Gate M40" is termed "HS" and "Gate M41" is termed "LS". In the second plot 403, a half bridge middle point voltage, which ranges from 400V to 0V, is shown. In the third plot 405, the LLC primary circuit through capacitor C51 and winding L51d is shown. In the fourth plot 407, the current through the secondary side diodes D52a and D52b is shown. In the fifth plot 409, the current sensing signals, i.e. feedback signals, are shown, which are the rectified current through the auxiliary winding L52a (in FIGS. 1 and 2) or L52a+L52d (in FIG. 3) and the averaged voltage between sensing pins ISNSP and ISNSN, termed "ISNS (filtered)".

Figure 5:
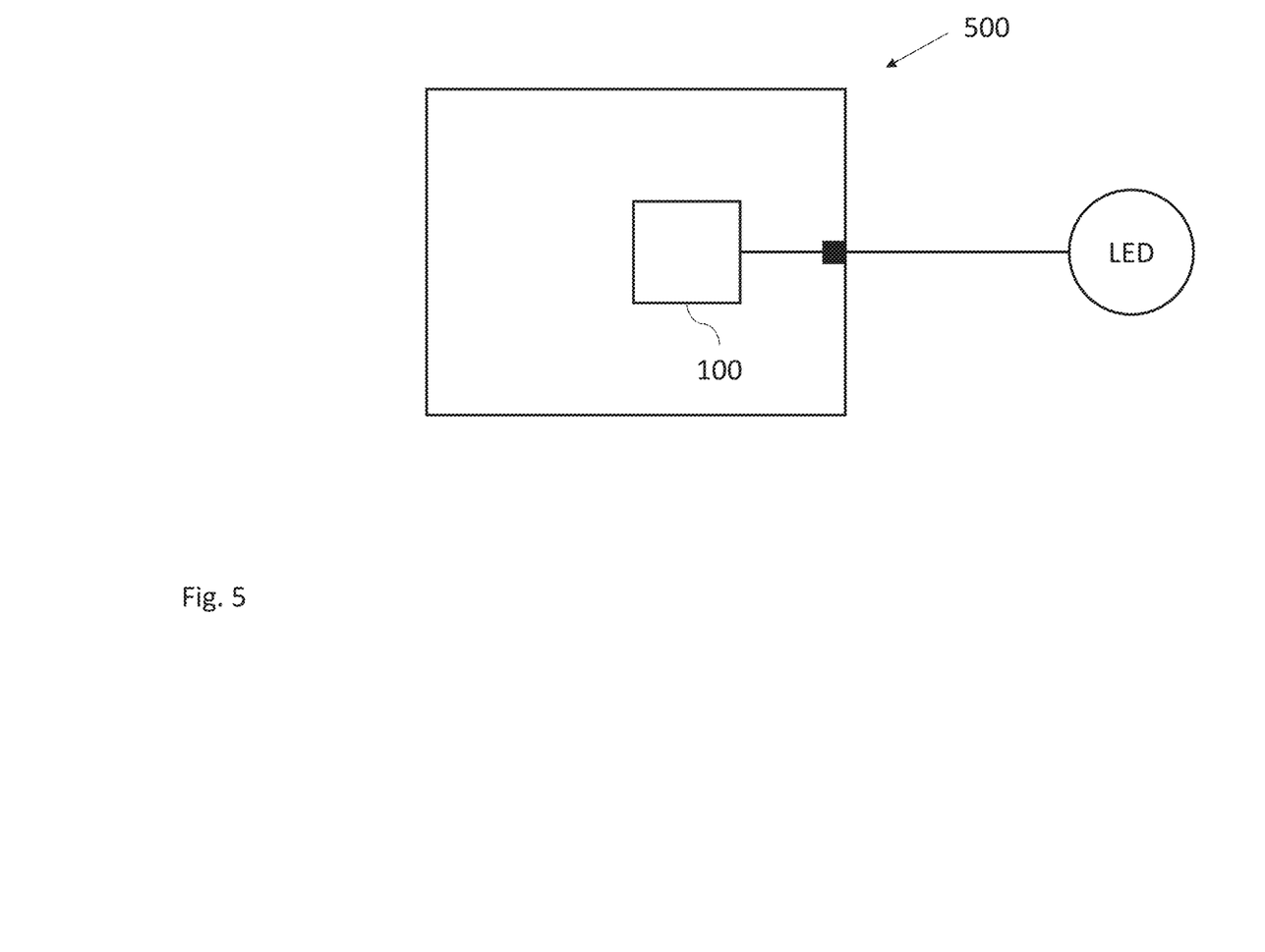
FIG. 5 shows a schematic diagram of a driver for supplying an LED load according to an embodiment.

FIG. 5 shows a schematic diagram of a driver 500 for supplying the LED load according to an embodiment.

The driver 500 comprises the isolated converter 100, as for instance shown in FIGS. 1-3, which may form a DC/DC converter of the driver 500.

An LED luminaire or other LED gear can comprise the driver 500.

Figure 6:
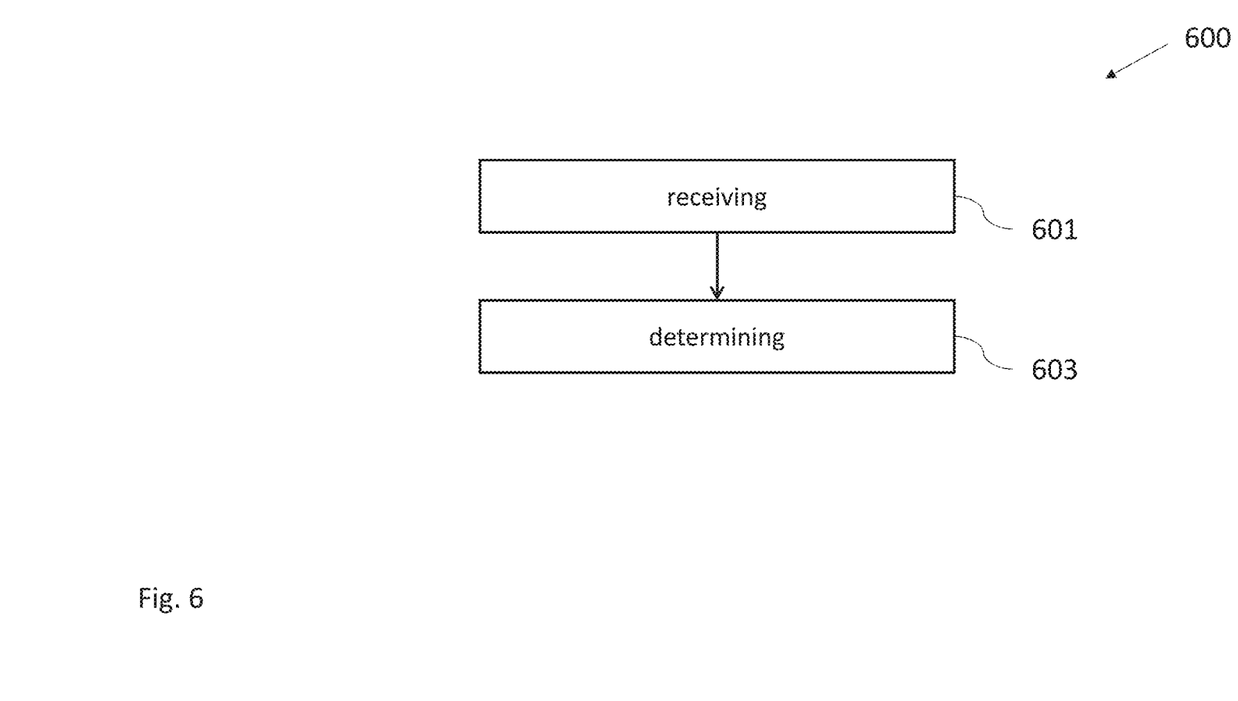
FIG. 6 shows a schematic diagram of a method for operating an isolated converter according to an embodiment.

FIG. 6 shows a schematic diagram of a method 600 for operating the isolated converter 100 according to an embodiment.

The method 600 comprises the steps of:
- receiving 601 the feedback signal by means of the sensing circuit 103 on the primary side of the galvanic isolation stage 101, wherein the feedback signal is proportional to the secondary side current; and
- determining 603 by means of the control unit 105 an output current of the isolated converter 100 based on the feedback signal;
- wherein at least one electrical characteristic of the sensing circuit 103 and/or the control unit 105 is adjustable to convert the feedback signal from a first ratio to a second ratio to the secondary side current.

In particular, the method 600 is a method for determining the secondary side current of an isolated converter 100, for instance any of the converters 100 shown in FIGS. 1-3.

Preferably, the sensing circuit 103 comprises the auxiliary winding L52a, L52d that is magnetically coupled to at least one secondary side winding, wherein the auxiliary winding L52a, L52d comprises an adjustable number of turns L52a, L52d that can be changed in one or more steps.

Preferably, the sensing circuit 103 comprises at least one shunt resistor R33, R34, wherein a total resistance of the at least one shunt resistor R33, R34 can be adjusted in a stepwise or a continuous manner, in particular by connecting or disconnecting two or more shunt resistors R33, R34 in parallel.

Preferably, the control unit 105 is configured to convert the feedback signal from the first to the second ratio by adjusting an amplifier gain of the internal amplifier 107 and/or by adjusting a reference voltage of the internal ADC 107.

All features of all embodiments described, shown and/or claimed herein can be combined with each other.

The invention claimed is:

1. An isolated converter (100) for providing a current supply to an LED load, comprising:
   - a galvanic isolation stage (101);
   - a sensing circuit (103) on a primary side of the isolation stage (101), which is magnetically coupled to a secondary side of the isolation stage (101);
   - wherein the sensing circuit (103) is configured to receive a feedback signal that is proportional to a secondary side current; and
   - a control unit (105) configured to determine an output current of the converter (100) based on the feedback signal;
   - wherein at least one electrical characteristic of the sensing circuit (103) and/or the control unit (105) is adjustable to convert the feedback signal from a first ratio to a second ratio to the secondary side current, the converter (100) is designed to provide the output current in at least one dimming range, and the feedback signal is set to a fixed ratio to the secondary side current for all dimming ranges of the converter (100), wherein the fixed ratio depends on a maximum current level to be detected.

2. The converter (100) according to claim 1, wherein the sensing circuit (103) comprises an auxiliary winding (L52a, L52d) that is magnetically coupled to at least one secondary side winding (L52b, L52c), wherein the auxiliary winding (L52a, L52d) comprises an adjustable number of turns that can be changed in one or more steps.

3. The converter (100) according to claim 1, wherein the sensing circuit (103) comprises at least one shunt resistor (R33, R34), wherein a total resistance of the at least one shunt resistor (R33, R34) can be adjusted in a stepwise or a continuous manner, in particular by connecting or disconnecting two or more shunt resistors (R33, R34) in parallel.

4. The converter (100) according to claim 1, wherein the control unit (105) is configured to internally modify the feedback signal.

5. The converter (100) according to claim 1, wherein the control unit (105) is configured to convert the feedback signal from the first to the second ratio by adjusting an amplifier gain of an internal amplifier (107) and/or by adjusting a reference voltage of an internal analog-to-digital converter (109).

6. The converter (100) according to claim 1, wherein the control unit (105) comprises an ASIC and/or a microcontroller.

7. The converter (100) according to claim 1, wherein the sensing circuit (103) is connected to the control unit (105) via one or two sensing pins (ISNSP, ISNSN) for forwarding the feedback signal.

8. A driver (500) for supplying an LED load, comprising an isolated converter (100) according to claim 1.

9. An isolated converter (100) for providing a current supply to an LED load, comprising:
   - a galvanic isolation stage (101);
   - a sensing circuit (103) on a primary side of the isolation stage (101), which is magnetically coupled to a secondary side of the isolation stage (101);
   - wherein the sensing circuit (103) is configured to receive a feedback signal that is proportional to a secondary side current; and
   - a control unit (105) configured to determine an output current of the converter (100) based on the feedback signal;
   - wherein at least one electrical characteristic of the sensing circuit (103) and/or the control unit (105) is adjustable to convert the feedback signal from a first ratio to a second ratio to the secondary side current, the converter (100) is designed to provide the output current in at least one dimming range, and the feedback signal is settable to different ratios to the secondary side current in two or more portions of the dimming range.

10. The converter (100) according to claim 9, wherein the sensing circuit (103) comprises an auxiliary winding (L52a, L52d) that is magnetically coupled to at least one secondary side winding (L52b, L52c), wherein the auxiliary winding (L52a, L52d) comprises an adjustable number of turns that can be changed in one or more steps.

11. The converter (100) according to claim 9, wherein the sensing circuit (103) comprises at least one shunt resistor (R33, R34), wherein a total resistance of the at least one shunt resistor (R33, R34) can be adjusted in a stepwise or a continuous manner, in particular by connecting or disconnecting two or more shunt resistors (R33, R34) in parallel.

12. The converter (100) according to claim 9, wherein the control unit (105) is configured to internally modify the feedback signal.

13. The converter (100) according to claim 9, wherein the control unit (105) is configured to convert the feedback signal from the first to the second ratio by adjusting an amplifier gain of an internal amplifier (107) and/or by adjusting a reference voltage of an internal analog-to-digital converter (109).

14. The converter (100) according to claim 9, wherein the control unit (105) comprises an ASIC and/or a microcontroller.

15. The converter (100) according to claim 9, wherein the sensing circuit (103) is connected to the control unit (105) via one or two sensing pins (ISNSP, ISNSN) for forwarding the feedback signal.

16. A driver (500) for supplying an LED load, comprising an isolated converter (100) according to claim 9.

* * * * *